Nov. 2, 1965

E. J. WELLAUER ETAL 3,214,989

VERTICAL RIGHT ANGLE SPEED REDUCER

Filed April 1, 1963

INVENTORS
EDWARD J. WELLAUER
RAYMOND F. PICKEL

BY
Thomas W. Ehrmann

ATTORNEY

INVENTORS
EDWARD J. WELLAUER
RAYMOND F. PICKEL

BY

*Thomas W. Ehemann*

ATTORNEY

Nov. 2, 1965     E. J. WELLAUER ETAL     3,214,989

VERTICAL RIGHT ANGLE SPEED REDUCER

Filed April 1, 1963     5 Sheets-Sheet 3

INVENTORS
EDWARD J. WELLAUER
RAYMOND F. PICKEL

BY

Thomas W. Ehemann

ATTORNEY

Nov. 2, 1965     E. J. WELLAUER ETAL     3,214,989
VERTICAL RIGHT ANGLE SPEED REDUCER
Filed April 1, 1963     5 Sheets-Sheet 4

INVENTORS
EDWARD J. WELLAUER
RAYMOND F. PICKEL

BY *Thomas W. Sherman*
ATTORNEY

Nov. 2, 1965

E. J. WELLAUER ETAL 3,214,989

VERTICAL RIGHT ANGLE SPEED REDUCER

Filed April 1, 1963

INVENTORS
EDWARD J. WELLAUER
RAYMOND F. PICKEL

BY

*Thomas W. Ehrmann*

ATTORNEY

United States Patent Office 3,214,989
Patented Nov. 2, 1965

---

3,214,989
VERTICAL RIGHT ANGLE SPEED REDUCER
Edward J. Wellauer, Wauwatosa, and Raymond F. Pickel, West Allis, Wis., assignors to The Falk Corporation, Milwaukee, Wis., a corporation of Wisconsin
Filed Apr. 1, 1963, Ser. No. 269,441
12 Claims. (Cl. 74—417)

This invention relates to vertical right angle speed reducers, and particularly to such a speed reducer including a housing comprised of a box-like enclosure with a removable cover, which enclosure is adapted to alternately support vertical, parallel intermediate and output shafts of double, triple and quadruple reduction gearing, and a high speed housing removably mounted on an end of the enclosure for supporting a horizontal input shaft, together with an integral lubricant distribution system for bearings mounted in the enclosure and supporting the vertical shafts with lubricant circulating means mounted exterior of the enclosure and within the high speed housing.

Vertical right angle speed reducers characteristically include a horizontal input shaft which drives a vertical output shaft by meshing bevel gear and pinion either directly or through intermediate shafts. The input shaft is adapted for attachment to a prime mover, and the output shaft may extend either above or below the speed reducer housing for connection to equipment to be driven, typically an agitator or mixer.

Because of the variety of driven equipment with which such speed reducers may be used, the various load and speed requirements of such driven equipment, and the different environments in which they are employed, it is necessary for manufacturers to offer a broad line of vertical right angle speed reducers to satisfy the needs of customers. For example, for a given range of torque capacity of the low speed output shaft, it is necessary to offer a variety of speed reducers of different degrees of speed reduction, such as both double and triple reduction units. Heretofore, separate speed reducers have been used to satisfy particular requirements with each unit representing a distinct product. This, of course, necessitates the stocking of a considerable quantity of parts and subassemblies each having practically no use outside of a particular rated speed reducer.

It is an object of this invention to provide a vertical right angle speed reducer including a housing formed in part from a box-like enclosure arranged and adapted for alternately mounting the parallel intermediate and output shafts of a plurality of degrees of reduction gearing, whereby the same enclosure may be employed in a plurality of speed reducers. The box-like enclosure includes a removable cover and is provided with a plurality of pairs of coaxial shaft openings which receive shaft bearings for mounting a vertical low speed output shaft and one or more vertical intermediate shafts in parallel spaced relation. A high speed housing is adapted for removable mounting on an end of the enclosure and the high speed housing supports a horizontal input shaft and may further support horizontal intermediate shafts. In this manner, the enclosure functions to support gearing of a variety of degrees of speed reduction and double, triple and quadruple reduction units may be formed employing the enclosure together with an appropriate high speed housing. Thus, a complete line of speed reducers requires the stocking of substantially fewer components.

In vertical right angle speed reducers, a special problem of lubrication exists. The speed reducer housing is commonly employed as a lubricant reservoir and the lower shaft bearings which mount the vertical shafts are below the level of lubricant in the housing so that they may simply be exposed to the lubricant in the housing. However, the upper shaft bearings for the vertical shafts are above the level of lubricant in the housing and it is, therefore, necessary to provide means for drawing lubricant from the housing, lifting it to the level of upper bearings and then distributing the lubricant to all of the upper bearings.

In the speed reducer of this invention, the removable cover of the box-like enclosure is provided with integral lubricant passages interconnecting the shaft openings in the cover which receive the upper bearings to form a lubricant distribution system including inlet passages. The lubricant circulating means, which may take alternate forms such as pumps, slingers and viscous pumps, is mounted exterior of the enclosure and within the high speed housing where it is driven by the input shaft or horizontal intermediate shaft, whereby the lubricant circulating means is easily accessible for repair or replacement and alternate forms may be used without modification to the box-like enclosure.

Accordingly, it is also an object of this invention to provide a vertical right angle speed reducer including a box-like enclosure adapted to alternately mount a vertical output shaft and one or more vertical intermediate shafts of double, triple, or quadruple reduction gearing and in which one end of the enclosure is provided with a mounting opening to removably receive a mounting member which, together with a high speed housing removably attached to the end of the enclosure, supports appropriate horizontal input and intermediate shafts.

It is another object of this invention to provide a vertical right angle speed reducer including a box-like enclosure having a removable cover, the enclosure forming a lubricant reservoir and the cover provided with an integral lubricant distribution system for upper vertical shaft bearings supported within the cover.

It is a further object of this invention to provide such a speed reducer together with lubricant circulating means mounted within a high speed housing removably attached to an end of the enclosure for ease of access to the circulating means.

It is also an object of this invention to provide such a vertical right angle speed reducer that is adapted to accept various forms of lubricant circulating means without modification to the box-like enclosure for the vertical shafts.

It is another object of this invention to provide a vertical right angle speed reducer including a box-like universal enclosure and a removable high speed housing permitting simple assembly and disassembly of the high speed housing including gearing mounted therein.

It is another object of this invention to provide such a speed reducer in which a high speed housing may alternately mount an input shaft of triple reduction gearing and an input shaft and a parallel intermediate shaft of quadruple reduction gearing.

The foregoing and other objects of this invention will appear in the description to follow. In the description, reference is made to the accompanying drawings which form a part hereof and in which there is shown by way of illustration specific forms in which this invention may be practiced. The forms will be described in detail to enable those skilled in the art to practice this invention but it is to be understood that other embodiments of the invention may be used and that structural changes to the embodiments described may be made by those skilled in the art without departing from the true scope of the present invention. Consequently, the following detailed description is not to be taken in a limiting sense and the scope of the present invention is best defined by the appended claims.

3

In the drawings:

FIG. 7 is a view in vertical section of a double reduction speed reducer in accordance with the present invention;

Figure 1:
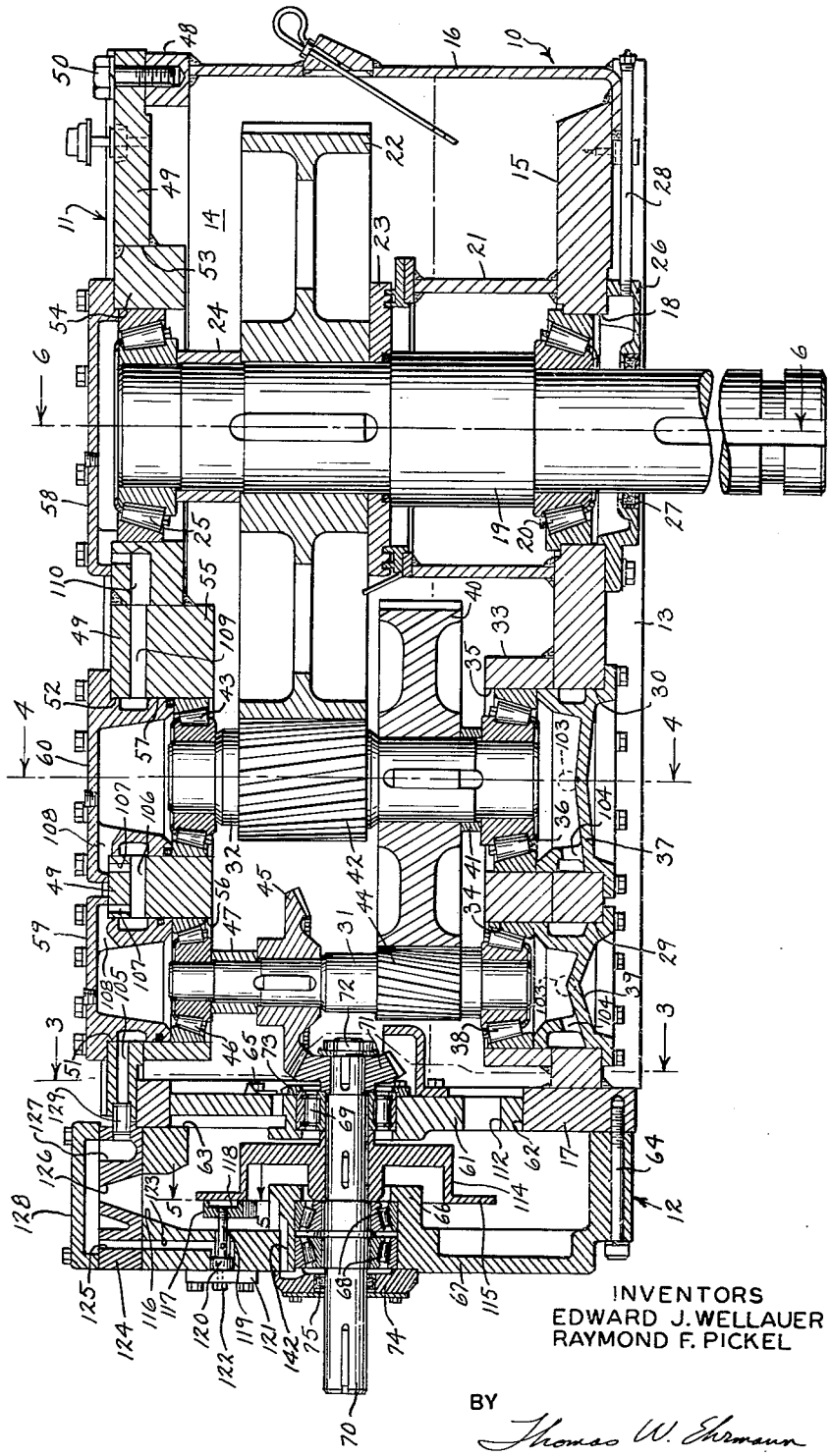
FIG. 1 is a view in vertical section of a triple reduction speed reducer in accordance with the present invention.
Figure 2:
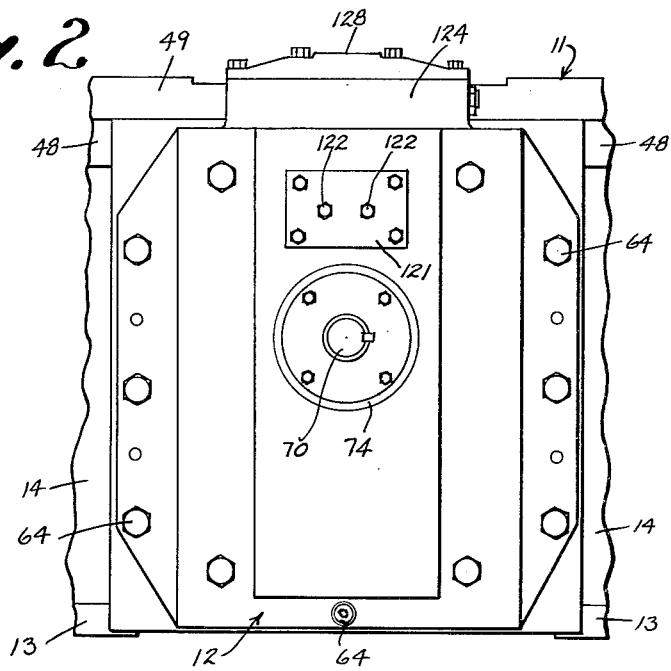
FIG. 2 is a partial view in elevation of the high speed end of the triple reduction speed reducer of FIG. 1.
Figure 3:
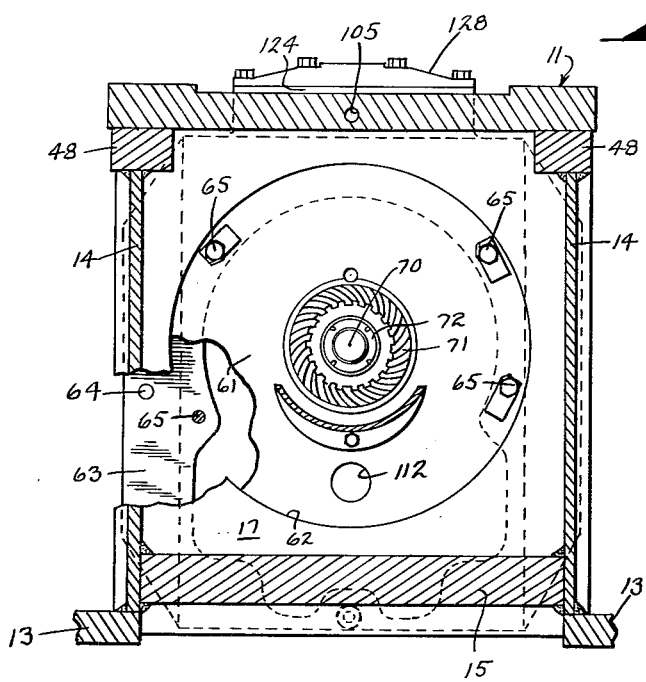
FIG. 3 is a view in vertical section taken in the plane of the line 3—3 of FIG. 1 with portions broken away for illustration only.

Generally, the vertical, right angle speed reducer according to this invention may incorporate gearing providing double, triple, or quadruple reduction of input speed. In FIGS. 1–6 the speed reducer housing is shown mounting gearing of a triple reduction gear train. The speed reducer housing is generally comprised of a box-like enclosure 10 having an open top that is closed by a removable cover 11 and a high speed housing 12 secured to one end of the enclosure 10. Specifically, the box-like enclosure 10 is fabricated of a pair of mounting base rails 13 which support opposed vertical side plates 14. A horizontal base plate 15 spans the base rails 13 and is secured to the same, and the base plate 15 supports a vertical end plate 16 and a heavier section vertical end plate 17, both of which join the ends of the side plates 14.

The base plate 15 is provided with three spaced and longitudinally aligned shaft openings of increasing diameter in the direction towards the end plate 16. The largest diameter shaft opening 18 is adapted to receive a low speed output shaft 19 which, in the embodiment of FIG. 1, has a downwardly extending portion that is keyed for connection to equipment to be driven. The low speed output shaft 19 is journaled in and is vertically supported by a lower tapered roller bearing 20 mounted in the shaft opening 18. A cylindrical lubricant well 21 is secured upright upon the base plate 15 concentric with the axis of the opening 18 in the base plate 15. The output shaft 19 mounts a low speed gear 22, and the low speed gear 22 rests upon a labyrinth oil deflector plate 23 that is axially supported by a shoulder formed on the low speed shaft 19 and which deflector plate 23 cooperates with an upper peripheral flange of the cylinder well 21 to seal the interior of the well 21 from the interior of the enclosure 10. A shaft spacer 24 that is disposed about the low speed shaft 19 rests upon the low speed gear 22 and axially supports an upper tapered roller bearing 25.

An open bearing retainer 26 is removably bolted to the bottom of the base plate 15 concentric with the output shaft 19 and supports a grease seal 27 that seals against the low speed shaft 19 to prevent the leakage of grease from the lower bearing 20 and from the well 21. Grease is supplied to the bearing 20 through a pipe 28 that carries a grease fitting at its end and which communicates with the hollow interior of the retainer 26.

The remaining two shaft openings 29 and 30 in the base plate 15 are adapted to accommodate first and second intermediate shafts 31 and 32, respectively. A bearing plate 33 is welded to the interior surface of the base plate 15 and is provided with bores 34 and 35 which register with the openings 29 and 30, respectively, in the base plate 15 and which provide extensions of such openings for the mounting of lower bearings. That is, the second intermediate shaft 32 is supported upon and journaled in a lower tapered roller bearing 36 mounted in the bore 35 of the bearing plate 33 and supported axially by a closed bearing retainer 37 that is removably bolted to the underside of the base plate 15 and extends into the aligned opening 30 and bore 35. Similarly, the first intermediate shaft 31 is journaled in and axially supported by a lower tapered roller bearing 38 mounted in the bore 34 of the bearing plate 33 and axially supported by a closed bearing retainer 39.

An intermediate gear 40 is keyed to the second intermediate shaft 32 and is supported by a shaft spacer 41 which rests on the lower bearing 36. An intermediate pinion 42 in meshing engagement with the low speed gear 22 of the output shaft 19 is formed on the second intermediate shaft 32, and an upper tapered roller bearing 43 is mounted adjacent the upper end of the second intermediate shaft 32.

An intermediate pinion 44 is formed on the first intermediate shaft 31 and is disposed in meshing engagement with the intermediate gear 40 of the second intermediate shaft 32. The first intermediate shaft 31 also supports and mounts a bevel gear 45 and an upper tapered roller bearing 46 axially supported by a shaft spacer 47.

The enclosure 10 also includes an upper peripheral mounting flange 48 that is secured to the top edge of the side plates 14 and the end plate 16. The cover 11 is mounted on the enclosure 10 and includes a cover plate 49 which is removably secured to the mounting flange 48 and the heavier section end plate 17 by bolts 50. The cover plate 49 is provided with spaced and longitudinally aligned openings 51, 52 and 53 that are coxial with the shaft openings 29, 30 and 18, respectively, of the base plate 15. A generally circular bearing plate 54 of heavier section is secured in the opening 53 of the cover plate 49 and has a central bore which mounts the upper bearing 25 of the low speed shaft 19. Another bearing plate 55 is secured to the underside of the cover plate 49 (see FIG. 4), and such bearing plate 55 is provided with axial bores 56 and 57 which register with the openings 51 and 52 and which mount the upper bearings 46 and 43, respectively, of the intermediate shafts 31 and 32.

A closed bearing retainer 58 is removably bolted to the bearing plate 54 to close the central bore thereof and to axially restrain the upper bearing 25 of the low speed shaft 19. Closed bearing retainers 59 and 60 are received in the aligned openings 51, 56 and 52, 57, respectively, of the cover plate 49 and the bearing plate 55, and both retainers 59 and 60 are removably bolted to the cover plate 49. The bearing retainers 59 and 60 axially restrain the upper bearings 46 and 43 of the intermediate shafts 31 and 32, respectively.

Generally, the high speed end of the speed reducer is formed by the high speed housing 12 which is secured to the enclosure 10, and by a mounting member 61 removably attached to the high speed housing 12 and received within a mounting opening in the enclosure 10. Specifically, the heavier section end plate 17 of the enclosure 10 has planar exterior face and is provided with a circular bore that forms a longitudinally directed mounting opening 62. The high speed housing 12 is preferably formed by casting and is provided with a central cavity, best viewed in FIGS. 1 and 3. An inner planar face 63 of the housing 12 is disposed against the outer planar face of the end plate 17, and the housing is held in place upon the end plate 17 by bolts 64 which are threaded in the end plate 17. The mounting member 61 takes the form of a circular plate and is removably mounted against the inner planar face 63 of the housing 12 by bolts 65. The mounting member 61 is received within the circular mounting opening 62 when the high speed housing 12 is in place upon the end plate 17.

The high speed housing 12 is formed with an integral hub portion 66 which extends inwardly into the cavity of the housing from a front support wall 67. The hub portion 66 is centrally bored to mount a pair of outer tapered roller bearings 68, and the mounting member 61 is provided with a coaxial bore which mounts an inner roller bearing 69. A high speed input shaft 70 is journaled in the pair of outer bearings 68 and in the inner bearing 69. The input shaft 70 has an outwardly extending outboard portion which is keyed for driving connection to a prime mover, and an inwardly extending outboard portion of the high speed shaft 70 mounts a bevel pinion 71 in meshing engagement with the bevel gear 45 of the first intermediate shaft 31. The bevel pinion 71 is held in place upon the input shaft 70 by a nut 72 which is threaded on the inner end of the input shaft 70.

An open bearing retainer 73 is disposed about the inner end of the input shaft 70 and is bolted to the mounting member 61 to axially restrain the inner bearing 69. Similarly, an open bearing retainer 74 is bolted to the front support wall 67 of the high speed housing 12 to restrain the outer bearings 68, and such bearing retainer 74 also mounts an oil seal 75 which engages the outer periphery of the input shaft 70.

In operation, power supplied to the high speed input shaft 70 will be transmitted to the first intermediate shaft 31 by the meshing bevel pinion 71 and bevel gear 45 and then to the second intermediate shaft 32 through the meshing intermediate pinion 44 and intermediate gear 40. The low speed output shaft 19, and consequently the driven equipment, is driven from the second intermediate shaft 32 by the meshing intermediate pinion 42 and low speed gear 22. In such manner a triple reduction of the input speed is accomplished.

The same box-like enclosure 10 including the removable cover 11 illustrated and described with reference to FIGS. 1–6 as accommodating the vertical shafts of triple reduction gearing is adapted, with the use of appropriate alternate high speed housings and mounting members, to mount the requisite gearing of either a double reduction speed reducer or a quadruple reduction speed reducer. Double and quadruple reduction speed reducers incorporating the enclosure 10 with the cover 11 are shown in section in FIGS. 7 and 9, respectively.

Figure 8:
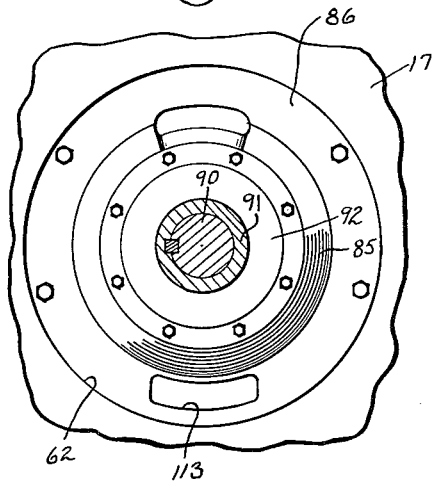
FIG. 8 is a view in section taken in the plane of the line 8—8 of FIG. 7.
Figure 5:
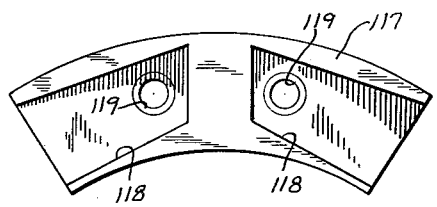
FIG. 5 is a view in section taken in the plane of the line 5—5 of FIG. 1.

Referring first to FIGS. 7 and 8 which illustrate a double reduction speed reducer, like numerals have been employed to designate like parts of the triple reduction speed reducer of FIGS. 1–6 and a description of the common parts will not be repeated. The double reduction embodiment also illustrates an alternative arrangement for a low speed output shaft 76 wherein the output shaft 76 extends upwardly beyond the cover 11 for attachment to driven equipment.

In FIG. 7 it may be seen that the identical fabricated box-like enclosure 10 and removable cover 11 support the output shaft 76 which mounts the low speed gear 22, and the enclosure 10 and cover 11 also support the intermediate shaft 32 having its intermediate pinion 42 in meshing engagement with the low speed gear 22. A closed bearing retainer 77 is employed to close the output shaft opening 18 in the base plate 15 and such closed bearing retainer 77 is bolted to the underside of the base plate 15. An open bearing retainer 78 is employed about the upper end of the output shaft 76, and such retainer 78 includes flanged configurations which cooperate with a labyrinth oil deflector in a hub 79 that is disposed about the extending end of the output shaft 76 and is secured thereto by set screws 80. The open bearing retainer 78 also mounts an oil seal 81 which engages the output shaft 76.

In the double reduction embodiment of the speed reducer, the first intermediate shaft 31 with its mounted gearing is eliminated, and the second intermediate shaft 32 is provided with a bevel gear 82 rather than an intermediate gear. The unused first intermediate shaft openings 29 and 59 in the base plate 15 and cover 11, respectively, are closed by a closure cap 83 bolted to the underside of the base plate 15 and by the normal closed bearing retainer 59 attached to the cover plate 49.

A high speed housing 84 of similar form as employed in the triple reduction embodiment heretofore described mounts a generally frusto-conical mounting member 85 including a circular mounting flange 86. The mounting member 85 is received within the circular mounting opening 62 in the enclosure 11 and projects into the enclosure 11 when the high speed housing 84 is bolted to the planar exterior face of the end plate 17. An integral hub portion 87 of the high speed housing 84 is centrally bored to receive a pair of outer tapered roller bearings 88. Likewise, the mounting member 85 has a central opening which mounts an inner roller bearing 89 adjacent its inner end. A high speed input shaft 90 is journaled in the outer bearings 87 and the inner bearing 89 and includes an inwardly projecting outboard portion which mounts a bevel pinion 91 in meshing engagement with the bevel gear 82. An open bearing retainer 92 is bolted to the inner end of the mounting member 85, and an open bearing retainer 93 surrounding the input shaft 90 and carrying an oil seal 94 is bolted to the front support wall 95 of the high speed housing 84.

Figure 9:
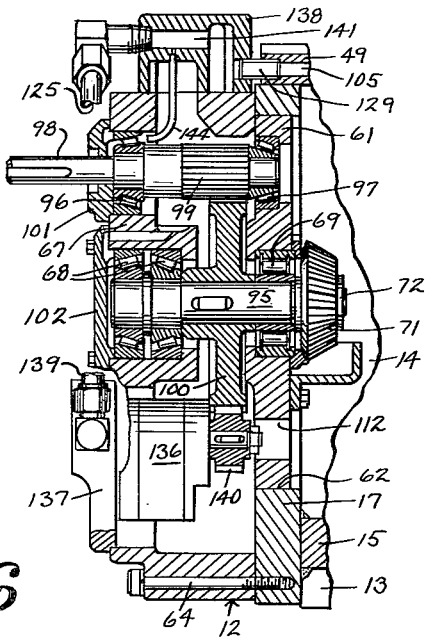
FIG. 9 is a partial view in vertical section of the high speed end of a quadruple reduction speed reducer in accordance with the present invention.

In the quadruple reduction embodiment of the speed reducer, the vertical first and second intermediate shafts 31 and 32 and the output shaft 19 of the triple reduction unit are employed and the additional reduction stage is accommodated within the high speed end. Consequently, only the high speed end of the quadruple reduction gearing is shown in FIG. 9. Changes which are made to accomplish a quadruple reduction in input speed are all contained within the high speed end of the speed reducer, and the high speed housing 12 and mounting member 61 of the triple reduction unit with slight modification may be employed. Specifically, the bevel pinion 71 is mounted on an outboard portion of a horizontal intermediate shaft 95 which is journaled in the outer and inner bearings 68 and 69, respectively. The mounting member 61 and the front support wall 67 of the high speed housing 12 are provided with coaxial bores spaced above the axis of the intermediate shaft 95 and which mount outer and inner tapered roller bearings 96 and 97, respectively. A high speed input shaft 98 is journaled in the bearings 96 and 97 parallel to the intermediate shaft 95 and has a high speed pinion 99 formed thereon which is in meshing engagement with an intermediate gear 100 mounted inboard on the intermediate shaft 95. An open bearing retainer 101 is bolted to the front wall 67 of the housing 12 to axially restrain the outer bearing 96, and a closed bearing retainer 102 is bolted to the front wall 67 of the housing 12 to close the alternate high speed input shaft opening therein. The meshing high speed pinion 99 and intermediate gear 100 provide the first step in the quadruple reduction and the additional three step reduction in input speed is accomplished in the manner of the triple reduction unit.

It will be seen from the foregoing description that the box-like enclosure 10 and the removable cover 11 provided as they are with three pairs of coaxial shaft openings are adapted to support the vertical shafts of alternate degrees of reduction gearing. That is, the same enclosure 10 and cover 11 may be employed in either double, triple or quadruple reduction gear units. Thus, it is necessary to stock only one form of enclosure 10 and cover 11 for all three speed reducers and the stock requirements are considerably reduced. Additionally, the intermediate shafts 31 and 32 find employment in more than one speed reducer.

By providing the end plate 17 of the enclosure 10 with a planar exterior surface and a universal mounting opening 62, appropriate alternate high speed housings and mounting members may be attached to the enclosure 10 to complete the housing for the speed reducer. The provision of a separate mounting member permits ready access of the gearing supported in the high speed end and the speed reducer may be readily modified, for example, to provide for an additional stage of speed reduction ahead of the triple reduction gearing without disturbing the intermediate or low speed gearing. Furthermore, the same high speed housing 12 and mounting member 61 may be employed for both triple and quadruple reduction speed reducers.

It is necessary in vertical right angle speed reducers to provide for lubrication of all shaft bearings and a special problem is presented in providing lubrication to the upper shaft bearings. To this end, the cover 11 is provided with an integral lubricant distribution system fed by lubricant circulating means which may take a variety of forms and which are mounted within the high speed housing.

Figure 4:
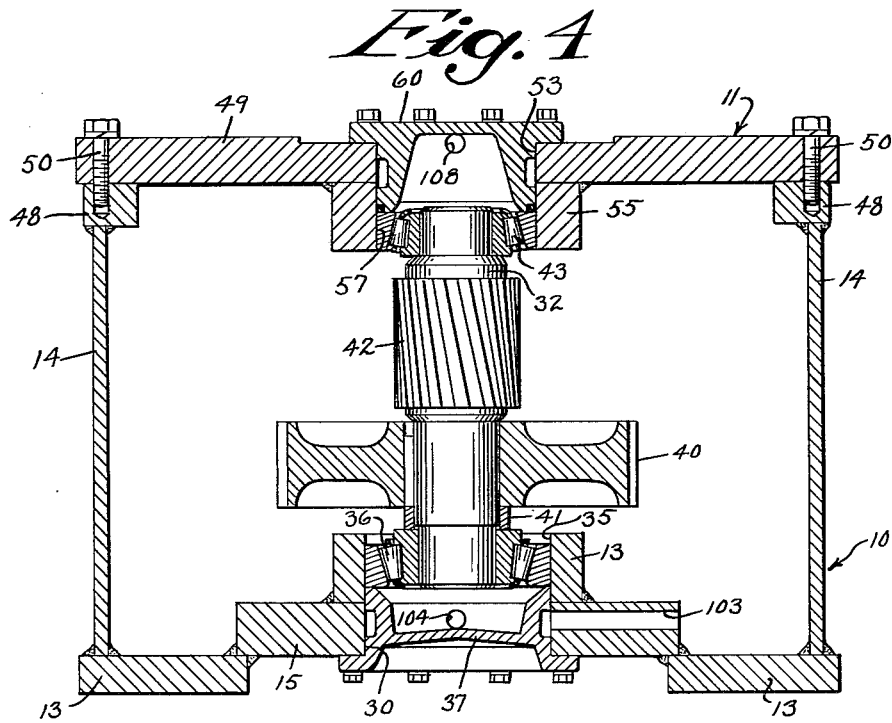
FIG. 4 is a view in vertical section taken in the plane of the line 4—4 of FIG. 1.

Referring again to FIGS. 1–6, the enclosure 10 forms a lubricant reservoir, and the level of oil in the enclosure 10 is shown in FIG. 1 by an interrupted line. The reservoir of oil contained in the enclosure 10 will supply necessary lubricant to the lower bearings 38 and 36 of the first and second intermediate shafts 31 and 32, respectively, since they are directly exposed to the oil in the enclosure 10. However, to insure complete circulation of oil through such lower bearings 38 and 36, oil is also supplied to the hollow interior of the closed bearing retainers 39 and 37. That is, the closed bearing retainers 39 and 37 are each provided with an annular external recess which cooperates with the openings 29 and 30 in the base plate 15 to form annular oil passages. The base plate 15 is provided with transverse bores 103 which lead from the interior of the enclosure 10 to the annular recesses in the closed bearing retainers 39 and 37 (see FIG. 4). Oil is supplied to the hollow interior of each of the closed bearing retainers 39 and 37 from the annular passages formed thereabout through openings 104 in the sides of the bearing retainers 39 and 37, as shown in FIGS. 1 and 4. Thus, oil is supplied from both above and below the lower bearings 38 and 36 and will be circulated through such bearings 38 and 36.

It is necessary to employ grease to lubricate the lower bearing 20 of the output shaft 19 since oil would leak past the seal 27. As indicated before, grease is applied to the lower bearing 20 through the pipe 28 communicating with the hollow interior of the bearing retainer 26 and a pool of grease is provided in the interior of the well 21.

The cover 11 is provided with integral oil passages interconnecting the shaft openings therein for lubrication of the upper bearings of the intermediate and output shafts. Each of the bearing retainers 52, 58 and 59 is provided with a hollow interior and the bearing retainers 59 and 60 have annular external recesses which cooperate with the openings 51 and 52, respectively, in the cover plate 49 to form annular oil passages. The cover plate 49 is longitudinally bored at its end adjacent the end plate 17 of the enclosure 10 to form an inlet passage 105 which communicates with the annular passage formed by the bearing retainer 59. Another longitudinal bore in the cover plate 49 forms an intermediate passage 106 connecting the annular passages formed by the retainers 59 and 60. This intermediate passage 106 forms the source for a metered supply of oil to the upper bearings 46 and 43 for the first and second intermediate shafts 31 and 32, respectively. That is, vertical bores 107 in the cover plate 49 lead from the passage 106 to openings 108 in the sides of each of the bearing retainers 59 and 60 so that oil circulating between the bearing retainers 59 and 60 will be supplied in a controlled amount to the hollow interiors of the retainers 59 and 60 where it is available for lubrication of the upper bearings 46 and 43.

Another longitudinal passage 109 is formed in the cover plate 49 and connects the annular passage formed by the bearing retainer 60 to a passage 110 formed in the heavier section bearing plate 54. This latter passage 110 in the bearing plate 54 communicates with the hollow interior of the upper bearing retainer 58 to supply lubricant to the upper bearing 25 for the output shaft 19.

Figure 6:
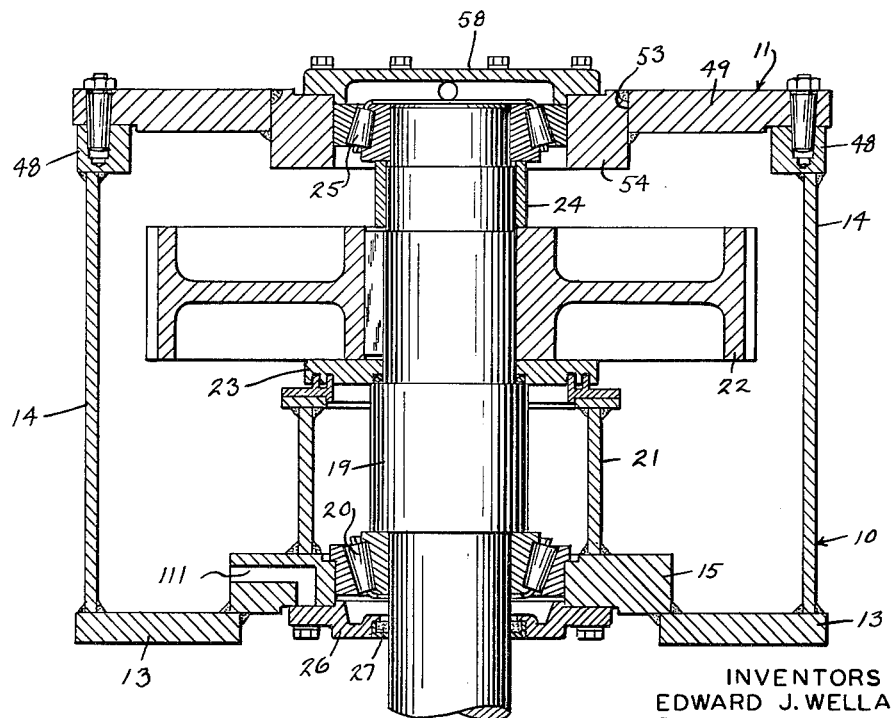
FIG. 6 is a view in vertical section taken in the plane of the line 6—6 of FIG. 1.
Figure 1:
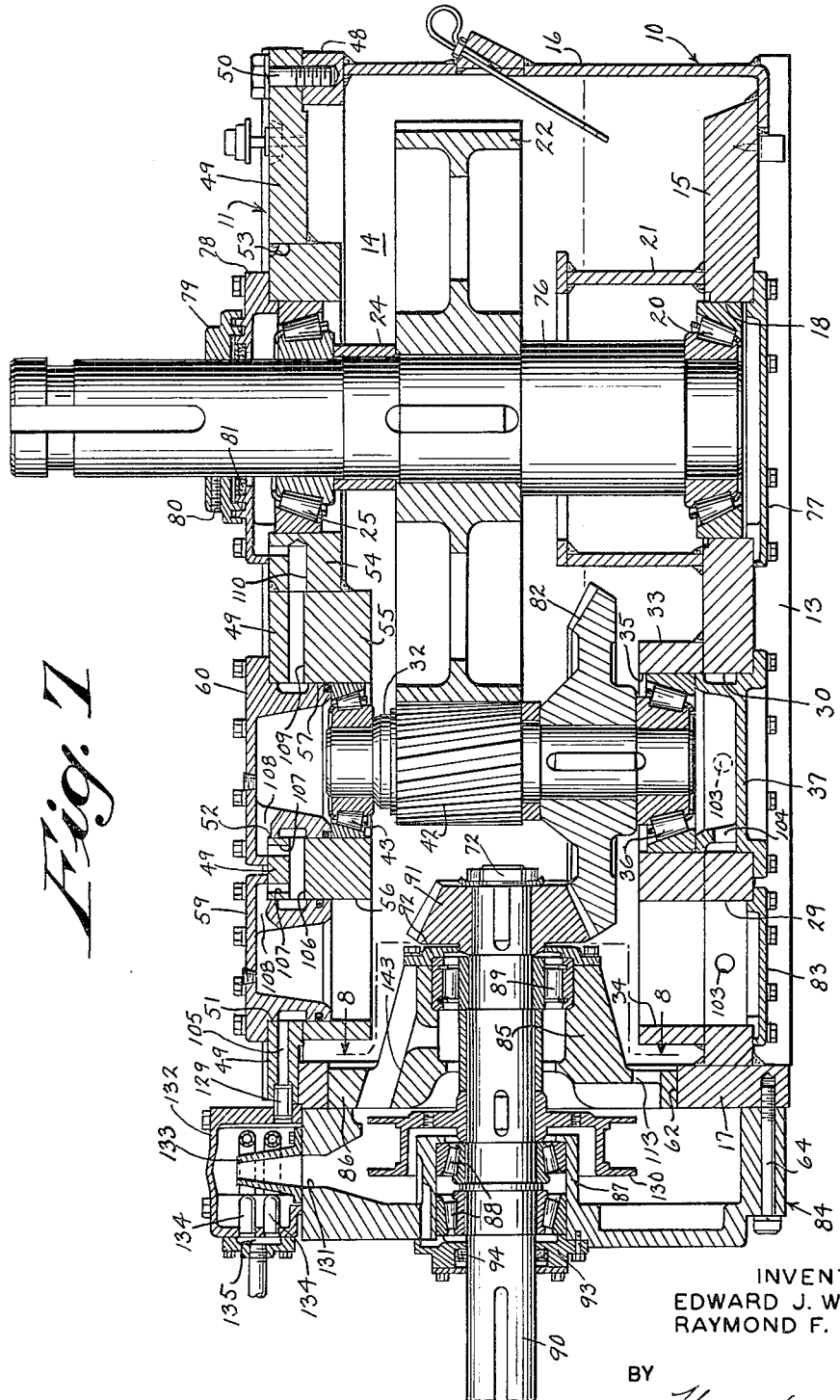

Referring to FIG. 7, the integral lubricant distribution system formed in the cover 11 will also function to lubricate the upper bearing 25 of the output shaft 76 which extends upwardly of the cover 11. Since the output shaft opening 18 may be closed by the closed bearing retainer 77, it is not necessary to use grease to lubricate the lower bearing 20. Therefore, oil from the reservoir in the enclosure 10 is supplied to the lower bearing 20 through a passage 111, as shown in FIG. 6, which communicates with the hollow interior of the bearing retainer 77.

To supply the lubricant to the inlet passage 105 in the cover 11 circulating means are employed which are mounted within the high speed housings and which draw oil from the cavity in the high speed housing. The cavity in the high speed housings is made an extension of the oil reservoir by providing each of the mounting members 61 and 85 with longitudinal openings 112 and 113, respectively, located at levels below the level of oil in the enclosure 10.

The necessary lifting of the oil from the supply within the high speed housing is accomplished by providing various forms of circulating means in the high speed housing. In FIG. 1, the circulating means illustrated as mounted in the high speed housing 12 consists of a slinger and viscous pump assembly. A slinger 114 is mounted on the inboard portion of the input shaft 70 and includes a radial flange 115. Under normal temperature conditions the oil would be sufficiently low in viscosity to permit the slinger 114 to fling oil upwardly through a vertical opening 116 and in the top of the high speed housing 12 for supply of the oil to the inlet passage 105. However, under abnormally low temperature operation the oil will have such high viscosity as to render this action most difficult. Thus, a viscous pump assembly is employed with the slinger 114 and this assembly includes a wiper plate 117 which is spaced slightly from the planar outer surface of the radial flange portion 115 of the slinger 114. The wiper plate 117 has a pair of radially spaced catcher recesses 118 and a pair of hollow tubes 119 are each threaded at one end into the wiper plate 117 to communicate with one of the recesses 118. The outer ends of the tubes 119 are secured to circular blocks 120 which are journaled in a pair of bores provided in the front wall 67 of the high speed housing 12. A keeper plate 121 is bolted to the exterior of the front wall 67 and supports a pair of screws 122 which are threaded in respective blocks 120 to support the same. The tubes 119 have radial openings adjacent vertical passages 123 formed in the front wall 67 of the high speed housing 12. In operation, as the slinger 114 is rotated through the reservoir of oil in the bottom of the high speed housing 12, oil will be carried upwardly on the radial flange 115 and will be accumulated in a catcher recess 118 of the wiper plate 117. The accumulated oil under pressure will travel through a tube 119 and then upward into a vertical passage 123. A pair of recesses 118 are provided to permit operation regardless of the direction of rotation of the input shaft 70.

It is necessary to provide a connection between the vertical passages 123 of the high speed housing and the inlet passage 105 of the cover 11. This is accomplished by an oil distributor assembly removably mounted on the top of the high speed housing 12. A block 124 is provided with vertical passages 125 which act as extensions of the passages 123 in the housing 12, a vertical opening 126 which acts as an extension of the vertical opening 116 in the housing 12, and a continuous trough 127 disposed about the vertical opening 126 and at the front of the block 124 between the vertical openings 125 and 126. The distributor assembly is completed by a hollow cap plate 128 and both the block 124 and the cap plate 128 are removably attached to the top of the housing 12 by through bolts. Oil which is forced up the vertical passages 123, 125 by the action of the viscous pump will be deposited in the trough 127 with any excess returning to the housing 12 through the vertical openings 126 and 116. An outlet passage of the block 124 is connected to the inlet passage 105 of the cover 11 by a tube 129 and communicates with the trough 127 to supply oil to the distribution system of the cover 11.

An alternate and simpler form of circulating means is shown in FIG. 7 wherein a slinger 130 is mounted for rotation upon the input shaft 90 and operates again in a reservoir of oil in the high speed housing 84. The slinger 130 throws oil through a vertical opening 131 in the high speed housing 84 to an alternate form of distributor assembly. The distributor assembly includes an outer hollow housing 132 removably secured to the top of the high speed housing 84 and a central member 133 having a vertical opening which acts as an extension of the vertical opening 131 of the high speed housing 84. Oil is thrown through the vertical opening 131 and will accumulate in the trough formed between the outer housing 132 and the central member 133. Again, an outlet passage in the outer housing 132 is connected to the inlet passage 105 of the cover 11 by a tube 129.

In FIG. 7 there is also shown means for cooling the oil before it is delivered to the upper shaft bearings. Specifically, a pair of vertically spaced coils 134 are mounted in the housing 132 surrounding the central member 133. The coils 134 each lead from a common inlet 135, around the member 133 and then back to a common outlet which is similar to the inlet 135. Water circulated through the coils 134 will cool the oil that is accumulated between the central member 133 and the outer housing 132.

In FIG. 9, still another alternate circulating means for the integral oil system is shown in association with the quadruple speed reduction gearing. In FIG. 9, a pump 136 is mounted in an opening provided in the front wall 67 of the high speed housing 12 on a plate 137 that is bolted to the housing 12. The pump 136 has an inlet opening which communicates with the reservoir of oil in the housing 12 and an outlet of the pump 136 is connected to an oil distributor cap 138 by a line 139. The pump 136 is driven from the intermediate shaft 95 by a gear 140 mounted on the shaft of the pump 136 and in meshing engagement with the intermediate gear 100. The line 139 connects with a passage 141 in the distributor cap 138 which communicates with the tube 129 connected to the inlet passage 105 of the cover 11.

Provision is also made to supply oil to the shaft bearings of the high speed ends of the speed reducer. For example, referring to FIG. 1, a trough 142 formed in the hub portion 66 of the high speed housing 12 catches oil from the slinger 114 and directs the oil to the outer bearings 68. A similar trough is formed in the hub portion 87 of the high speed housing 84. Additionally, the mounting member 85 employed with the double reduction speed reducer has a sloping channel 143 which receives oil from the slinger 130 and supplies the oil to the input shaft 90 and the inner bearing 89. A spray bar 144 leads from the passage 141 in the distributor cap 138 and is directed to the outer bearing 96 for the input shaft 93 of the quadruple reduction speed reducer.

It will be seen that lubrication of upper shaft bearings is simply and effectively accomplished by the provision of an integral lubricant distribution system within the cover 11. Such lubricant distribution system remains unchanged for different multiples of speed reduction. Various forms of circulating means may be employed to lift the lubricant from the natural reservoir of the box-like enclosure 10 to the inlet passage 105 of the cover 11. The circulating means are located entirely external of the enclosure 10 and cover 11 so that change in the form of circulating means may be accomplished without modification of the enclosure 10 and cover 11 and without disturbing the gearing contained therein. For example, the pump 136 could be employed in the high speed housing 12 of the triple reduction unit of FIG. 1 with the substitution of the distributor cap 138 and the addition of gearing on the input shaft 70 to drive the pump 136. Furthermore, the slinger 130 could be employed in place of the slinger 114 and viscous pump assembly again with the substitution of the appropriate distributor assembly. The circulating means are mounted within the high speed housings for ready access and the housing can accommodate the various forms of circulating means by the addition of a proper oil distributor assembly on the top surface of the high speed housing.

Provision is made for supplying lubricant to the upper shaft bearings under conditions of high viscosity of the lubricant by use of the viscous pump. The wiper plate 117 of the viscous pump assembly may be adjusted for proper clearance with the radial flange 115 of the slinger 114 by the use of shims. That is, the wiper plate 117 may be adjusted inwardly toward the flange 115 by shimming between the circular blocks 120 and the keeper plate 121, and the wiper plate 117 may be adjusted outwardly by shimming between the keeper plate 121 and the front wall 67 of the high speed housing. Provision is also made for cooling the lubricant before it is supplied to the upper shaft bearings by use of the cooling coils 134 mounted in the distributor assembly.

We claim:

1. In a vertical right angle speed reducer, the combination comprising: a box-like enclosure including a base, a pair of side walls and a pair of end walls each rising vertically from the base, and a removable cover spaced vertically from the base and mounted on the side and end walls, said base and said cover being provided with a series of coaxial pairs of shaft openings including a pair of low speed output shaft openings; upper and lower shaft bearings disposed within said shaft openings in said base and said cover; said enclosure forming a lubricant reservoir and said cover being provided with integral lubricant passages forming a lubrication distribution system interconnecting successive shaft openings in said cover for lubrication of said upper shaft bearings; one end wall of said enclosure that is remote from the output shaft openings being provided with a longitudinally directed mounting opening therethrough; a high speed housing removably mounted upon the exterior of said one end wall and about said mounting opening and including a front support wall and an open rear wall communicating with a cavity in the high speed housing; a mounting member detachably mounted on the rear wall of said high speed housing and received within said mounting opening in said one end wall, said mounting member including a lubricant opening communicating between the hollow interior of said enclosure and the cavity of said high speed housing; meshing reduction gearing within said enclosure and said high speed housing and including a vertical output shaft mounted in the bearings disposed within the output shaft openings of said base and said cover and a horizontal input shaft journaled in bearings in the front wall of said high speed housing and in said mounting member; and lubricant circulating means mounted within said high speed housing to supply lubricant from the cavity within said high speed housing to the lubricant distribution system of said cover.

2. In a vertical right angle speed reducer, the combination comprising: a box-like enclosure including a base, a pair of side walls and a pair of end walls each rising vertically from the base, and a removable cover spaced vertically from the base and mounted on the side and end walls, said base and said cover being provided with a series of coaxial pairs of shaft openings including a pair of low speed output shaft openings; upper and lower shaft bearings disposed within said shaft openings in said base and said cover, one end wall of said enclosure that is remote from the output shaft openings being provided with a longitudinally directed mounting opening therethrough; said enclosure forming a lubricant reservoir and said cover including integral lubricant passages forming a lubrication distribution system interconnecting successive shaft openings in said cover for lubrication of said upper shaft bearings and including an inlet passage at the end of said cover adjacent said one end wall; a high speed housing removably mounted upon the exterior of said one end wall and about said mounting opening and including a front support wall and an open rear wall communicating with a cavity in the high speed housing; a mounting member detachably mounted on the rear wall of said high speed housing and received within said mounting opening in said one end wall, said mounting member including a lubricant opening communicating between the hollow interior of said enclosure and the cavity of said high speed housing; a lubricant distributor assembly removably mounted upon the top of said high speed housing and having an outlet connected to said inlet passage in said cover; meshing reduction gearing within said enclosure and said high speed housing and including a vertical output shaft mounted in the bearings disposed within the output shaft openings of said base and said cover and a horizontal input shaft journaled in bearings in the front wall of said high speed housing and in said mounting member; and lubricant circulating means mounted within said high speed housing to supply lubricant from the cavity within said housing to said lubricant distributor assembly.

3. A speed reducer in accordance with claim 2 wherein said high speed housing and said distributor assembly have registering vertical openings leading from the cavity of said high speed housing to a trough formed in said distributor assembly, said trough being connected to the outlet of said distributor assembly, and wherein said circulating means comprise a slinger mounted for rotation on said input shaft within said cavity and below said registering vertical openings, whereby rotation of said input shaft will cause said slinger to fling lubricant upwardly through said registering vertical openings and into said trough.

4. A speed reducer in accordance with claim 2 wherein the front wall of said high speed housing and said distributor assembly have registering vertical openings which lead upwardly to a trough formed in said distributor assembly, said trough being connected to the outlet of said distributor assembly; and wherein said circulating means comprises a slinger mounted for rotation on said input shaft within the cavity of said high speed housing and including a radial flange, and a viscous pump comprising a wiper plate having a pair of spaced catcher recesses disposed adjacent a face of said radial flange, and a pair of hollow tubes connected to said wiper plate and journaled in said front wall of said high speed housing, said tubes each communicating at one end with one of said catcher recesses and each tube having an outlet disposed within said vertical opening in said high speed housing whereby lubricant wiped from the slinger will be fed to said trough.

5. A speed reducer in accordance with claim 2 wherein said circulating means comprises: a pump mounted on said front wall of said high speed housing and having a pump shaft, an inlet within the cavity of said high speed housing, and an outlet; means connecting the outlet of said pump with said distributor assembly; and meshing gearing connecting said pump shaft with said input shaft.

6. A speed reducer in accordance with claim 2 together with cooling coils disposed within said distributor assembly adapted to receive circulated coolant for cooling of the lubricant before the same enters the inlet passage of said cover.

7. In a vertical right angle speed reducer, the combination comprising: a box-like enclosure including a base, a pair of opposed side walls rising vertically from the base, and a pair of opposed end walls rising vertically from the base and joining the ends of the side walls, said enclosure forming a lubricant reservoir; a removable cover mounted on the side and end walls and spaced from said base, said base and said cover being provided with a plurality of coaxial pairs of shaft openings including a pair of low speed output shaft openings and a pair of intermediate shaft openings, said cover including integral lubricant passages forming a lubrication distribution system interconnecting successive shaft openings in said cover and including an inlet passage at an end of said cover remote from said low speed output shaft openings, one end wall of said enclosure that is remote from the output shaft openings having a generally planar exterior surface and being provided with a longitudinally directed mounting opening therethrough; upper and lower shaft bearings disposed within the shaft openings in said base and said cover; a vertical output shaft mounted in the shaft bearings in said output shaft openings; an intermediate shaft mounted in the shaft bearings in said intermediate shaft openings; meshing gearing mounted on said output shaft and said intermediate shaft including a bevel gear mounted on said intermediate shaft; a high speed housing mounted upon said exterior surface of said one end wall and about said mounting opening, said high speed housing including a front support wall and an open rear wall communicating with a cavity in the high speed housing; a generally frusto-conical mounting member detachably mounted on said rear wall of said high speed housing and extending through and received within said mounting opening in said one end wall; an input shaft journaled in said shaft support front wall and said mounting member and mounting a bevel pinion in meshing engagement with said bevel gear; and lubricant circulating means mounted within the cavity of said high speed housing and driven from said input shaft for supplying lubricant from said reservoir to said inlet passage.

8. In a vertical right angle speed reducer, the combination comprising: a box-like enclosure including a base, a pair of opposed side walls rising vertically from the base, and a pair of opposed end walls rising vertically from the base and joining the ends of the side walls, said enclosure forming a lubricant reservoir; a removable cover mounted on the side and end walls and spaced from said base, said base and said cover being provided with three coaxial pairs of shaft openings including a pair of low speed output shaft openings, said pairs of shaft openings adapted to receive a vertical output shaft and vertical first and second intermediate shafts of triple and quadruple reduction gearing, said cover including integral lubricant passages forming a lubrication distribution system interconnecting successive shaft openings in said cover and an inlet passage at an end of said cover remote from said low speed output shaft openings, one end wall of said enclosure that is remote from the output shaft openings having a generally planar exterior surface and being provided with a longitudinally directed mounting opening therethrough; a high speed housing mounted upon said exterior surface of said one end wall and about said mounting opening, said high speed housing having a front support wall and an open rear wall communicating with a cavity in the high speed housing; a mounting member detachably mounted on said rear wall of said high speed housing and received within said mounting opening in said one end wall, said high speed housing and said mounting member being adapted alternately to mount a horizontal input shaft of triple reduction gearing and a horizontal input shaft and horizontal intermediate shaft of quadruple reduction gearing; meshing reduction gearing mounted in said enclosure and said high speed housing and including a vertical output shaft and a horizontal input shaft; and lubricant circulating means mounted within the cavity of said high speed housing for supplying lubricant from said reservoir to said inlet passage.

9. In a vertical right angle speed reducer, the combination comprising: a box-like enclosure including a base, a pair of opposed side walls rising vertically from the base, and a pair of opposed end walls rising vertically from the base and joining the ends of the side walls, said enclosure forming a lubricant reservoir; a removable cover mounted on the side and end walls and spaced from said base, said base and said cover being provided with three longitudinally aligned pairs of coaxial shaft openings including a pair of low speed output shaft openings and coaxial pairs of first and second intermediate shaft openings, said cover including integral lubricant passages forming a lubrication distribution system interconnecting successive shaft openings in said cover and including an inlet passage at an end of said cover remote from said low speed output shaft openings, one end wall of said enclosure that is remote from the output shaft openings having a generally planar exterior surface and being provided with a circular mounting opening therethrough; upper and lower shaft bearings disposed within the shaft openings in said base and said cover; a vertical output shaft mounted in the shaft bearings in said output shaft openings; first and second intermediate shafts mounted in the shaft bearings in said intermediate shaft openings; meshing gearing mounted on said output shaft and said intermediate shafts including a bevel gear mounted on said first intermediate shaft; a high speed housing mounted upon said exterior surface of said one end wall and about said mounting opening, said high speed housing including a front support wall and an open rear wall communicating with a cavity in the high speed housing; a circular mounting member detachably mounted on said rear wall of said high speed housing and received within said mounting opening in said one end wall; a horizontal input shaft journaled in said shaft support front wall and said mounting member and mounting a bevel pinion in meshing engagement with said bevel gear; and lubricant circulating means mounted within the cavity of said high speed housing and driven from said input shaft for supplying lubricant from said reservoir to said inlet passage.

10. In a vertical right angle speed reducer, the combination comprising: a box-like enclosure including a base, a pair of opposed side walls rising vertically from the base, and a pair of opposed end walls rising vertically from the base and joining the ends of the side walls, said enclosure forming a lubricant reservoir; a removable cover mounted on the side and end walls and spaced from said base, said base and said cover being provided with three longitudinally aligned pairs of coaxial shaft openings including a pair of low speed output shaft openings and pairs of first and second intermediate shaft openings, said cover including integral lubricant passages forming a lubrication distribution system interconnecting successive shaft openings in said cover and including an inlet passage at an end of said cover remote from said low speed output shaft openings, one end wall of said enclosure that is remote from the output shaft openings having a generally planar exterior surface and being provided with a circular mounting opening therethrough; upper and lower shaft bearings disposed within the shaft openings in said base and said cover; a vertical output shaft mounted in the shaft bearings in said output shaft openings; first and second intermediate shafts mounted in the shaft bearings in said intermediate shaft openings; meshing gearing mounted on said output shaft and said intermediate shafts including a bevel gear mounted on said first intermediate shaft; a high speed housing mounted upon said exterior surface of said one end wall and about said mounting opening, said high speed housing including a front support wall and an open rear wall communicating with a cavity in the high speed housing; a circular mounting member detachably mounted on said rear wall of said high speed housing and received within said mounting opening in said one end wall; a horizontal input shaft journaled in said shaft support front wall and said mounting member and mounting an input pinion; a horizontal intermediate shaft journaled in said front wall and said mounting member and mounting a driven gear meshing with said input pinion and a bevel pinion meshing with said bevel gear; and lubricant circulating means mounted within the cavity of said high speed housing and driven from said horizontal intermediate shaft for supplying lubricant from said reservoir to said inlet passage.

11. In a vertical right angle speed reducer, the combination comprising: a box-like enclosure including a base, a pair of side walls and a pair of end walls each rising vertically from the base, and a removable cover spaced vertically from the base and mounted on the side and end walls, said base and said cover being provided with a series of coaxial pairs of shaft openings including a pair of low speed output shaft openings; upper and lower shaft bearings disposed within said shaft openings in said base and said cover; said enclosure forming a lubricant reservoir and said cover being provided with integral lubricant passages forming a lubrication distribution system interconnecting successive shaft openings in said cover for lubrication of said upper shaft bearings; one end wall of said enclosure that is remote from the output shaft openings being provided with a longitudinally directed mounting opening therethrough; hollow high speed housing means removably mounted upon said one end wall and received within said mounting opening, said high speed housing means including a lubricant passage connecting the hollow interior of said enclosure and the hollow interior of said high speed housing means; meshing reduction gearing within said enclosure and said high speed housing means including a vertical output shaft mounted in the bearings disposed within the output shaft openings for said base and said cover and a horizontal input shaft journaled in bearings in said high speed housing means; and lubricant circulating means mounted within said high speed housing means to supply lubricant from within said high speed housing means to the lubricant distribution system of said cover.

12. In a vertical right angle speed reducer, the combination comprising: a box-like enclosure including a base, a pair of opposed side walls rising vertically from the base, and a pair of opposed end walls rising vertically from the base and joining the ends of the side walls, a removable cover mounted on the side and end walls and spaced from said base, said base and said cover being provided with three pairs of coaxial shaft openings adapted to receive in parallel spaced relation a vertical output shaft and vertical first and second intermediate shafts of triple and quadruple reduction gearing, one end wall of said enclosure that is remote from the output shaft openings having a generally planar exterior surface and being provided with a longitudinally directed mounting opening therethrough; a high speed housing mounted upon said exterior surface of said one end wall and about said mounting opening, said high speed housing having a front support wall and an open rear wall communicating with a cavity in the high speed housing; a mounting member detachably mounted on said rear wall of said high speed housing and received within said mounting opening in said one end wall, said high speed housing and said mounting member being adapted alternately to mount a horizontal input shaft of triple reduction gearing and a horizontal input shaft and horizontal intermediate shaft of quadruple reduction gearing; and meshing reduction gearing mounted in said enclosure and in said high speed housing and including a vertical output shaft and a horizontal input shaft.

References Cited by the Examiner

UNITED STATES PATENTS

| | | | |
|---|---|---|---|
| 2,156,739 | 5/39 | Schmitter | 74—606 |
| 3,029,661 | 4/62 | Schmitter | 74—467 |

FOREIGN PATENTS

| | | |
|---|---|---|
| 926,168 | 5/63 | Great Britain. |

DON A. WAITE, *Primary Examiner.*